G. A. SCHWER AND O. E. BORNHAUSER.
VALVE MECHANISM.
APPLICATION FILED JAN. 5, 1920.
1,389,276.
Patented Aug. 30, 1921.
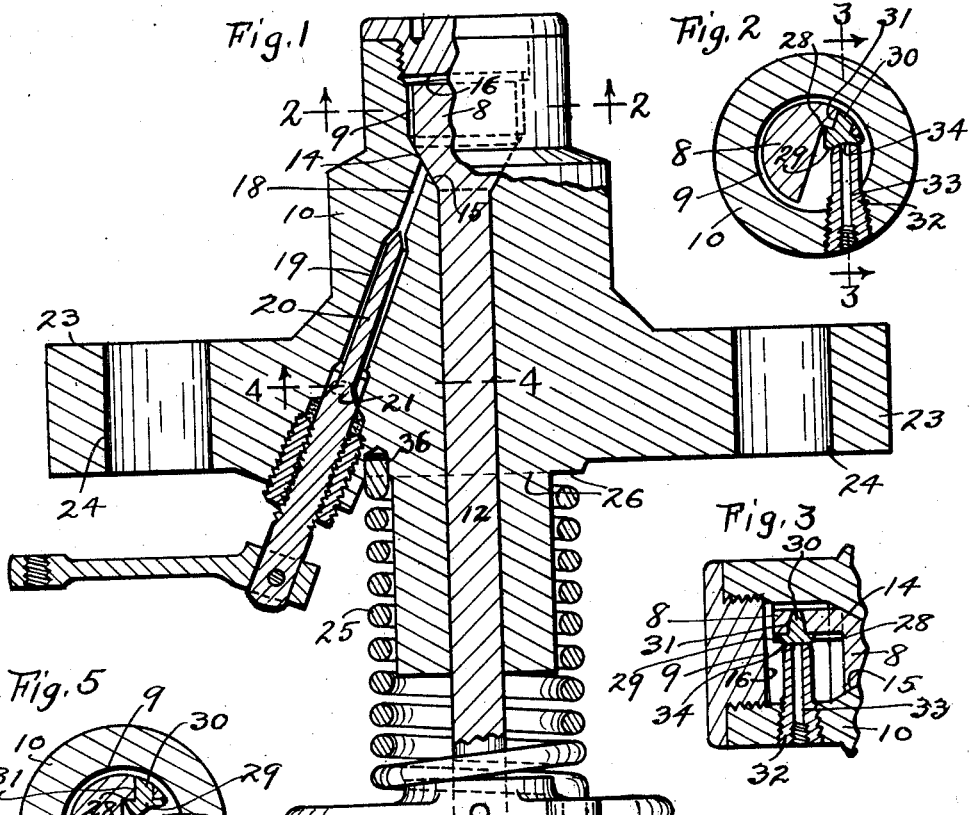
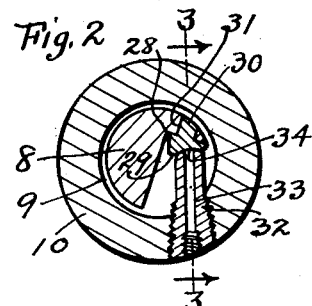
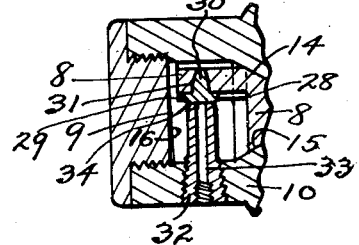
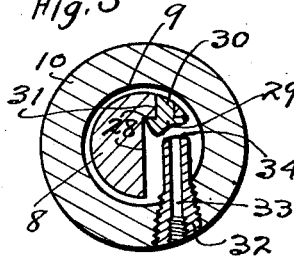
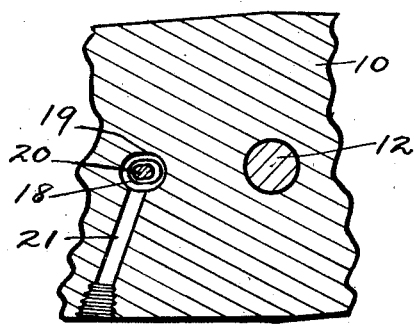
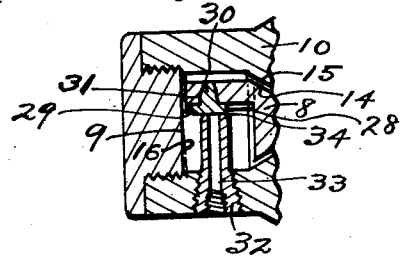
Inventors:
George A. Schwer
and Otto E. Bornhauser
By
Their Attorney

UNITED STATES PATENT OFFICE.

GEORGE A. SCHWER AND OTTO E. BORNHAUSER, OF SANDUSKY, OHIO.

VALVE MECHANISM.

1,389,276.  Specification of Letters Patent.  Patented Aug. 30, 1921.

Application filed January 5, 1920. Serial No. 349,606.

*To all whom it may concern:*

Be it known that we, GEORGE A. SCHWER and OTTO E. BORNHAUSER, citizens of the United States, and residing at Sandusky, in the county of Erie and State of Ohio, have invented a new and useful Valve Mechanism, of which the following is a specification.

This invention relates to improvements in valve-mechanism, and more especially to valve-mechanism comprising a valve-casing which is provided internally with two valve-seats and has a fluid-feeding passage extending to and adapted to discharge at one of said seats and a port extending to the other of said seats, and houses an endwise shiftable rotatable member which is arranged in a chamber formed interiorly of the valve-casing and has two valves formed thereon to control communication respectively through said port and through the aforesaid passage.

One object of this invention is to have such a relative arrangement of and to so construct or form the component members of said valve-mechanism that one valve is moved from a closed position into an open position or vice versa by and during movement of said valve carrying member endwise in the required direction, that the hereinbefore mentioned fluid-feeding passage is in communication with the aforesaid chamber in the open position of said valve, that the other valve is moved from a closed position into an open position or vice versa by a partial rotation of said valve-carrying member in the required direction, and that the aforesaid port is in open relation with said chamber in the open position of the last-mentioned valve.

Another object is to enable endwise movement of said valve-carrying member in the open position of the valve which is moved from its closed position into an open position or vice versa by and during a partial rotation of the valve-carrying member, and a further object is to render said valve-carrying member shiftable endwise in either position of said valve.

Another object is to render said valve-carrying member rotatable in the closed position of the valve which is moved from its closed position into an open position or vice versa by and during endwise movement of the valve-carrying member in the required direction, and a further object is to have the valve-carrying member rotatable in either position of said valve.

Another object is to render said valve-carrying member movable endwise and rotatable simultaneously.

Another object is to provide improved means comprising a single spring acting to retain the valve-carrying member in a position in which both valves are closed or seated.

Another object is to utilize the hereinbefore mentioned chamber for receiving two different fluids to be brought into intimate contact with each other, and to have the hereinbefore mentioned port utilizable in supplying one of said fluids to said chamber, and also to utilize said port to permit the escape from said chamber of the mixture or product resulting from said contact of said fluids in said chamber.

Another object is to facilitate the assemblage of the component members and operation of the valve-mechanism, and to render said mechanism compact and simple and durable in construction.

With these objects in view, and to attain any other object hereinafter appearing, this invention consists in certain features of construction, and combinations and relative arrangements of parts, hereinafter described in this specification, pointed out in the claims, and illustrated in the accompanying drawings.

In said drawings, Figure 1 is a view largely in central section of valve-mechanism embodying our invention, and in this figure the valve which controls communication through the hereinbefore mentioned fluid-feeding passage is shown closed. Fig. 2 is a section taken along the line 2—2, Fig. 1. Fig. 3 is a section taken along the line 3—3, Fig. 2. Fig. 4 is a section taken along the line 4—4, Fig. 1. Fig. 5 is a section corresponding with Fig. 2, except that in Fig. 5 the valve controlling communication through the hereinbefore mentioned port is shown open whereas in Fig. 2 said valve is shown closed. Fig. 6 is a section corresponding with Fig. 3, except that in Fig. 6 the valve-controlling communication through the aforesaid fluid-feeding passage is shown seated whereas in Fig. 3 said valve is shown unseated.

Referring to said drawings, 8 indicates an endwise shiftable rotatable body or member contained within a chamber 9 which is formed interiorly of a valve-casing 10 and on one end of and integral with an endwise shiftable rotatable shaft 12 which is preferably of steel. Said shaft is operated in any approved manner and has bearing in the valve-casing. Preferably the chamber 9 is circular in cross-section, and said chamber extends endwise of and is somewhat longer than the body or member 8 to permit movement of the latter endwise of said chamber. The shaft 12 extends from the chamber 9, at a point centrally of one end of said chamber, to the exterior of and outwardly beyond the valve-casing and is shown provided at its outer end with handle-forming arms 13. The body or member 8 is provided externally, at the inner end of the shaft 12, with an annular beveled shoulder 14 which forms a valve. It will be observed that the shaft 12 constitutes means for operating the valve-carrying member 8, that said valve-carrying member is shifted endwise in the one direction or the other according as the shaft is shifted endwise in the one or the other direction, and that said valve-carrying member is rotated in the one or the other direction according as the shaft is rotated in the one direction or the other. The valve-forming shoulder 14 faces in the direction of the outer end of and is concentric relatively to the shaft 12. The valve-casing is provided internally and opposite the valve-forming shoulder 14 with an annular valve-seat 15 which is concentric in relation to the shaft 12 and flares in the direction of the free end of the valve-carrying member 8, and the chamber 9 has an end wall 16 opposite said end of the valve-carrying member. The valve-casing preferably comprises a removable portion forming said wall and threaded into the remainder or body of the valve-casing. The valve-carrying member 8 is enough smaller diametrically than the chamber 9, between the valve 14 and the free extremity of said valve-carrying member, to be continuously spaced at its outer circumference from the surrounding wall of said chamber, and consequently from the valve-casing, between said extremity of said valve-carrying member and said valve. A fluid-feeding passage 18, formed in the valve-casing, extends to and is adapted to discharge at the valve-seat 15, and said passage is enlarged in diameter, as at 19, a suitable distance from from said valve-seat. A needle-valve 20 extends into the diametrically larger portion 19 of the passage 18 and is employed in regulating the feed of fluid through said passage. Said needle-valve is attached to the valve-casing in any approved manner and extends to the exterior and outside of the valve-casing where it is adjusted in any approved manner. The application and adjustment of a needle-valve are too well known to require further description in this specification. The diametrically larger portion 19 of the passage 18 is in communication with a passage 21 formed in the valve-casing at an angle to the passage 18 and adapted to receive liquid or fluid to be fed to it by a suitably applied feed-pipe not shown. In Figs. 1 and 3 of the drawings the valve-carrying member 8 is shown in position with its valve 14 in contact with the valve-seat 15, and the relative arrangement of the parts is such that in said position of said valve-carrying member said valve is closed and covers the discharging end of the passage 18, and obviously said valve-carrying member in said position is spaced from the end wall 16 of the chamber 9. The valve-casing is provided externally with flanges 23 having bolt-holes 24 for the reception of bolts (not shown) for securing the valve-casing to a supporting member not shown, and the valve-casing has its portion which extends toward but is spaced from the shaft-arms 13 surrounded by a helical spring 25 which is interposed between a shoulder 26 formed on and externally of the valve-casing and said arms and acts to retain the valve-carrying member in the position in which its valve 14 is seated and closed as shown in Fig. 1. Obviously pushing inwardly on the outer end of the shaft 12 shifts the valve-carrying member 8 endwise toward the end wall 16 of the chamber 9 and consequently in the direction required to remove the valve 14 from the seat 15, as shown in Fig. 6, and thereby open the valve so as to place said passage in communication with said chamber.

The valve-carrying member 8 is provided with a recess 28 which extends endwise of said member between its free extremity and the valve 14. Said recess is continuously in communication with the chamber 9. The valve-carrying member 8 is provided internally of the recess 28, between its free extremity and the valve-forming shoulder 14, with a valve which is preferably formed by the head 29 of a pin having its shank 30 driven tightly into a hole 31 formed in the valve-carrying member. The valve-casing is provided, opposite the valve-forming head 29 of said pin, with a tubular member 32 which is threaded into and therefore removable from the valve-casing and extends from the exterior of the valve-casing into the chamber 9 and into the recess 28. Said tubular member 32 forms a port 33 which extends from end to end of said member and is adapted to communicate, at the inner end of said member, with the recess 28, and consequently with the chamber 9. A valve-seat 34 is formed on the inner and free end of the tubular member 32 circumferentially of said port, and said tubular member is adapted to be placed in communication at its outer end with a source of fluid-supply in any approved manner. The spring 25 not only acts to retain the valve-carrying member 8 in position with the valve 14 seated and closed, but is attached at one end, as at 35, to an arm 13 of the shaft 12 and at its other end, as at 36, to the valve-casing and arranged to operate as a torsional spring acting to retain said valve-carrying member in position with the valve 29 seated and closed. It will be observed that endwise movement of the shaft 12 against the action of the spring 25 and in the direction required to shift the valve-carrying member toward the end wall 16 of the chamber 9 unseats the valve 14 as shown in Fig. 6 and thereby obviously place the chamber 9 and recess 28 in communication with the passage 18, that the relative arrangement of the parts and the dimensions and contour of the valve 29 and valve-seat 34 are such that said valve 29 and said seat 34 do not interfere with the movement of the valve-carrying member endwise as required to open and close the valve 14, that the valve-carrying member is movable to unseat the valve 14 as shown in Fig. 6 or even into contact with the wall 16 of the chamber 9 in the closed position of the valve 29 without unseating the latter, that only a partial rotation of the valve-carrying member against the action of the spring 25 is required to move the valve 29 from its closed position shown in Figs. 2 and 3 into an open position shown in Fig. 5, that the valve-carrying member is rotatable to actuate the valve 29 from its closed position into an open position in the closed position of the valve 14 without unseating the latter, that either valve can be moved from its closed position into an open position or vice versa in either position of the other valve, that all of the objects hereinbefore stated are successfully attained, and that the valve-carrying member may be manipulated as required to simultaneously move both valves from their closed position into an open position against the action of the spring 25.

We would here remark that means for supplying a fluid to the port 33 from outside of the valve-casing and for disposing of and utilizing the mixture or product formed in the chamber 9 and discharged from said chamber at said port, not forming a part of our improved valve-mechanism, are not regarded as requiring illustration and description in this specification, but we would have it understood that our invention broadly embraces any valve-mechanism which not only comprises an endwise shiftable rotatable valve-carrying member within the interior chamber of a valve-casing having two valve-seats which are formed the one at the discharging end of a fluid-feeding passage and the other at the inner end of a port extending between said chamber and the exterior of the valve-casing, but involves such a relative arrangement of the parts and such contour, construction and dimensions of said valve-carrying member that the latter has one valve which is moved from its closed position into an open position or vice versa during movement of the valve-carrying member endwise in the required direction and has another valve which is moved from its closed position into an open position or vice versa during a partial rotation of said valve-carrying member in the required direction.

What we claim is:

1. In valve-mechanism, the combination, with a valve-casing having an interior chamber and a passage for feeding fluid to said chamber and also a port spaced from said passage, and an endwise shiftable rotatable member contained in said chamber and having a valve arranged to control communication through said passage and a valve arranged to control communication through the aforesaid port, said port being in open relation with said chamber in the open position of the second-mentioned valve, the aforesaid passage being in communication with said chamber in the open position of the first-mentioned valve, one of said valves being arranged to be moved from a closed position into an open position or vice versa by and during movement of the rotatable valve-carrying member endwise in the required direction and the other of said valves being arranged to be moved from a closed position into an open position or vice versa by and during rotation of said valve-carrying member in the required direction, of resilient means acting to retain said valve-carrying member in a position in which both valves are closed, and means for operating said valve-carrying member against the action of said resilient means.

2. In valve-mechanism, a valve-casing having an interior chamber and a passage for feeding fluid to said chamber and also a port spaced from said passage, an endwise shiftable rotatable valve-carrying member arranged in said chamber and having a valve which is arranged to control communication through said passage and to be moved from a closed position into an open position or vice versa by and during movement of said valve-carrying member endwise in the required direction and also having a valve which is arranged to control communication through the aforesaid port and to be moved from a closed position into an open position or vice versa by and during rotation of said valve-carrying member in the required direction, a helical spring attached at one end to the valve-casing and operatively connected at its other end with the valve-carrying member and acting to retain the valve-carrying member in a position in which both valves are closed, and means for operating the valve-carrying member against the action of said spring, the aforesaid port being in open relation with the aforesaid chamber in the open position of the second-mentioned valve, and the aforesaid passage being in communication with said chamber in the open position of the first-mentioned valve.

3. In valve-mechanism, a valve-casing having an interior chamber and a passage for feeding fluid to said chamber and also a port spaced from said passage, a rotatable valve-carrying member contained in said chamber and having a valve which is arranged to control communication through said passage, and also having a valve which is arranged to control communication through the aforesaid port and to be moved from a closed position into an open position or vice versa by and during a partial rotation of said valve-carrying member in the required direction, and means for operating said valve-carrying member, said port being in open relation with the aforesaid chamber in the open position of the second-mentioned valve, the aforesaid passage being in communication with said chamber in the open position of the first-mentioned valve, and the valve-carrying member being shiftable endwise and arranged to move the first-mentioned valve from its closed position into an open position or vice versa by and during movement of the valve-carrying member endwise in the required direction while the second-mentioned valve is open.

4. In valve-mechanism, a valve-casing having an interior chamber and a passage for feeding fluid to said chamber and also a port spaced from said passage, a rotatable valve-carrying member contained in said chamber and having a valve for controlling communication through said passage and also having a valve which is arranged to control communication through the aforesaid port and to be moved from a closed position into an open position or vice versa by and during a rotation of said valve-carrying member in the required direction, and means for operating said valve-carrying member, said port being in open relation with the aforesaid chamber in the open position of the second-mentioned valve, the aforesaid passage being in communication with said chamber in the open position of the first-mentioned valve, and the valve-carrying member being shiftable endwise and arranged to move the first-mentioned valve from its closed position into an open position or vice versa by and during movement of the valve-carrying member endwise in the required direction in either position of the second-mentioned valve.

5. In valve-mechanism, a valve-casing having an interior chamber and a passage for feeding fluid to said chamber and a port spaced from said passage, an endwise shiftable member arranged in said chamber and having a valve which is arranged to control communication through said passage and to be moved from a closed position into an open position or vice versa by and during movement of said valve-carrying member endwise in the required direction and also having a valve arranged to control communication through the aforesaid port, and means for operating said valve-carrying member, said port being in open relation with the aforesaid chamber in the open position of the second-mentioned valve, the aforesaid passage being in communication with said chamber in the open position of the first-mentioned valve, and the valve-carrying member being rotatable and arranged to move the second-mentioned valve from its closed position into an open position or vice versa by and during rotation of the valve-carrying member in the required direction while the first-mentioned valve is closed.

6. In valve-mechanism, a valve-casing having an interior chamber and a passage for feeding fluid to said chamber and a port spaced from said passage, an endwise shiftable member arranged in said chamber and having a valve which is arranged to control communication through said passage and to be moved from a closed position into an open position or vice versa by and during movement of said valve-carrying member endwise in the required direction and also having a valve for controlling communication through the aforesaid port, and means for operating said valve-carrying member, said port being in open relation with the aforesaid chamber in the open position of the second-mentioned valve, the aforesaid passage being in communication with said chamber in the open position of the first-mentioned valve, and the valve-carrying member being rotatable and arranged to move the second-mentioned valve from its closed position into an open position or vice versa by and during a partial rotation of the valve-carrying member in the required direction in either position of the first-mentioned valve.

7. In valve-mechanism, a valve-casing having an interior chamber and a passage for feeding fluid to said chamber and a port spaced from said passage, an endwise shiftable rotatable valve-carrying member arranged in said chamber and having a valve which is arranged to control communication through said passage and to be moved from a closed position into an open position or vice versa by and during movement of said valve-carrying member endwise in the required direction and also having a valve which is arranged to control communication through the aforesaid port and to be moved from a closed position into an open position or vice versa by and during a partial rotation of said valve-carrying member in the required direction, and means for operating said valve-carrying member, said port being in open relation with the aforesaid chamber in the open position of the second-mentioned valve, the aforesaid passage being in communication with said chamber in the open position of the first-mentioned valve, and the valve-carrying member being movable endwise and rotatable simultaneously.

8. In valve-mechanism, a valve-casing having an interior chamber and a fluid-feeding passage at one end of said chamber, an endwise shiftable rotatable valve-carrying member which is arranged in said chamber and has a valve arranged to control communication through said passage and to be moved from a closed position into an open position or vice versa by and during movement of said valve-carrying member endwise in the required direction, and means for operating the shaft, said passage being in communication with said chamber in the open position of said valve, said valve-carrying member having a recess which extends endwise of the valve-carrying member and is continuously in communication with said chamber and being provided in said recess with a valve, the valve-casing being provided opposite the last-mentioned valve with a port arranged to communicate with said recess in the open position of said last-mentioned valve, said last-mentioned valve being arranged to control communication through said port and to be moved from a closed position into an open position or vice versa by and during a partial rotation of said valve-carrying member in the required direction.

9. In valve-mechanism, a valve-casing having an interior chamber and a fluid-feeding passage at one end of said chamber, an endwise shiftable rotatable valve-carrying member which is arranged in said chamber and has a valve arranged to control communication through said passage and to be moved from a closed position into an open position or vice versa by and during movement of said valve-carrying member endwise in the required direction, and means for operating the shaft, said passage being in communication with said chamber in the open position of said valve, said valve-carrying member having a recess which is continuously in communication with said chamber and being provided in said recess with a valve, the valve-casing being provided opposite the last-mentioned valve with a tubular member which extends into said recess and forms a port arranged to communicate with said recess in the open position of said last-mentioned valve, said last-mentioned valve being arranged to control communication through said port and to be moved from a closed position into an open position or vice versa by and during a partial rotation of said valve-carrying member in the required direction.

10. In valve-mechanism, a valve-casing having an interior chamber and an annular valve-seat which is arranged at one end flares toward the opposite end of the chamber and also having a fluid-feeding passage extending to said seat, an endwise shiftable rotatable shaft extending from a point centrally of the first-mentioned end of said chamber to the exterior and outside of and having bearing in the valve-casing and provided with a valve-carrying member which is arranged in said chamber and has an external annular beveled shoulder which is arranged opposite said seat and forms a valve arranged to control communication through said passage and to be moved from a closed position into an open position or vice versa by and during movement of the shaft endwise in the required direction, said passage being in communication with said chamber in the open position of said valve, said valve-carrying member also having a valve arranged between the second-mentioned end of said chamber and the aforesaid shoulder, the valve-casing having a port associated with the last-mentioned valve, the latter being arranged to control communication through said port and to be moved from one to the other of its positions by and during its rotation in the required direction.

11. In valve-mechanism, a valve-casing having an interior chamber and a passage for feeding fluid to said chamber and a port spaced from said passage, a shaft extending from one end of said chamber to the outside of and supported from the valve-casing and having a valve-carrying member which is arranged in said chamber and has a valve arranged to control communication through said passage and to be moved from a closed into an open position or vice versa by and during movement of the shaft endwise in the required direction and also has a valve arranged to control communication through the aforesaid port and to be moved from a closed into an open position or vice versa by and during a partial rotation of the shaft in the required direction, and a helical spring which has its coils extending circumferentially of the shaft and is operatively connected at one end with the shaft and attached at its other end to the valve-casing, the aforesaid port and the aforesaid passage being in open relation with said chamber in the open position of the second-mentioned valve and first-mentioned valve respectively, and the relative arrangement of the parts being such that the aforesaid rotation and endwise movement of the shaft are against the action of the spring.

In testimony whereof, we sign the foregoing specification, in the presence of two witnesses.

GEORGE A. SCHWER.
OTTO E. BORNHAUSER.

Witnesses:
A. W. MASSEY,
HELEN M. DORER.